F. X. LAUTERBUR.
SAFETY CLUTCH DEVICE FOR MIXERS.
APPLICATION FILED MAY 1, 1922.
1,422,213.
Patented July 11, 1922.
3 SHEETS—SHEET 3.
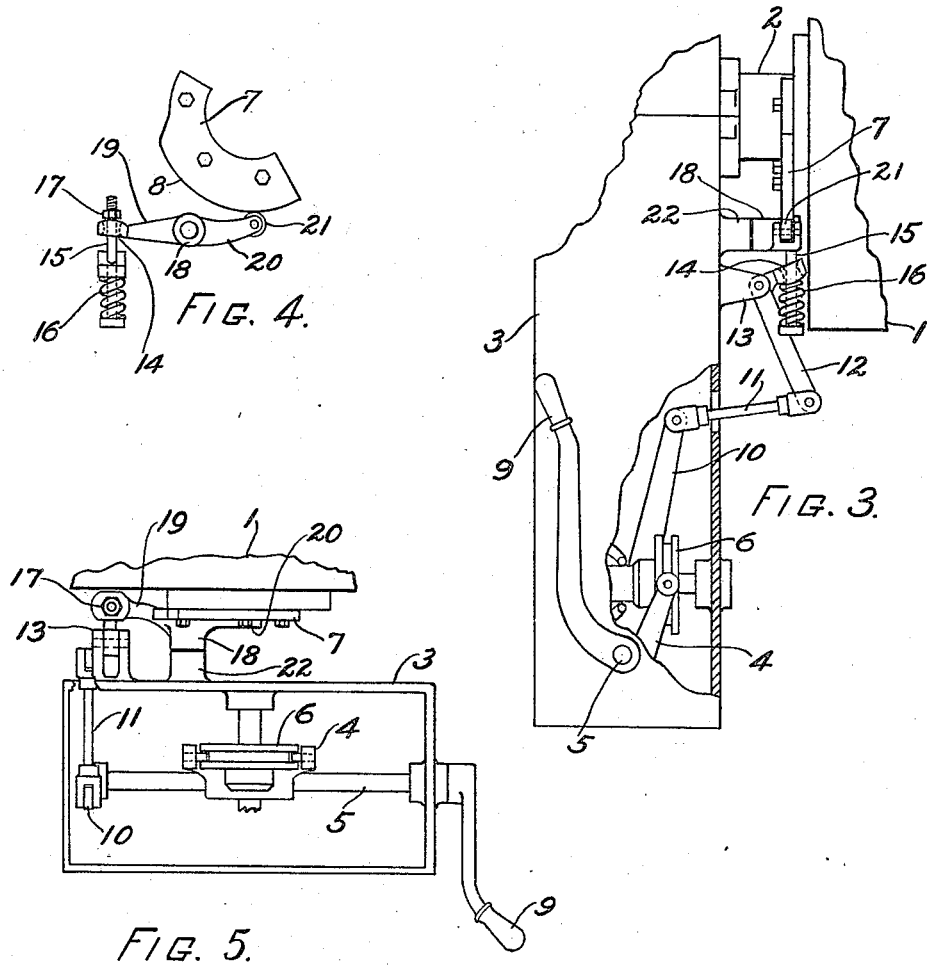
INVENTOR:
FRANK X. LAUTERBUR,
BY Allen & Allen
HIS ATTORNEYS.

UNITED STATES PATENT OFFICE.

FRANK X. LAUTERBUR, OF SIDNEY, OHIO.

SAFETY CLUTCH DEVICE FOR MIXERS.

1,422,213.  Specification of Letters Patent.  Patented July 11, 1922.

Application filed May 1, 1922. Serial No. 557,628.

*To all whom it may concern:*

Be it known that I, FRANK X. LAUTERBUR, a citizen of the United States, and a resident of Sidney, in the county of Shelby and State of Ohio, have invented certain new and useful Improvements in Safety Clutch Devices for Mixers, of which the following is a full, clear, and exact description, reference being had to the accompanying drawings, forming part of this specification.

My invention relates to safety devices for use with horizontal food mixing machines, wherein the movement of the bowl in dumping the contents thereof operates on the clutch devices for applying motive power to the mixing blades.

In devices of this character it has been proposed in the past to control the application of power to the mixing blades for a like purpose to my invention by turning on and off the power, such as that of an electric motor. This is not sufficient, however, since it is desired to impart slight, well controlled movement to the mixing blades during the act of dumping, and a turning on of an electric switch is not readily controlled.

In mixing machines of the type noted, the bowl is supported on trunnions in such a way as to be tipped over laterally, so that the orifice in the bowl is partially inverted and the contents of the bowl flows out of it into the desired receptacle.

It is the object of my invention to apply to such mixers, a drive in which is inserted a clutch for coupling power to the mixing blades and in connection with this clutch to provide resilient means for throwing it out of mesh, which operate automatically at a selected position of the bowl in the act of tipping.

Thus in the absence of a positive interference by the operator, there will be no danger of his getting caught with the mixer blades and injured. By a forcing of the clutch handle, the clutch can be closed against the compression of the spring, to give a partial movement to the mixing blade. As soon as the handle is released, however, the spring will open the clutch again.

I accomplish this object, together with a range of adjustability to time the clutch as desired, by that certain construction and arrangement of parts to be hereinafter more specifically pointed out and claimed.

In the drawings,

Figure 3 is a fragmentary front elevation of the parts shown in Figures 1 and 2, showing the clutch mechanism "thrown out."

Figure 4 is a detail of the cam and coacting parts.

Figure 5 is a plan view of the mechanism shown in Figure 3.

Figure 1:
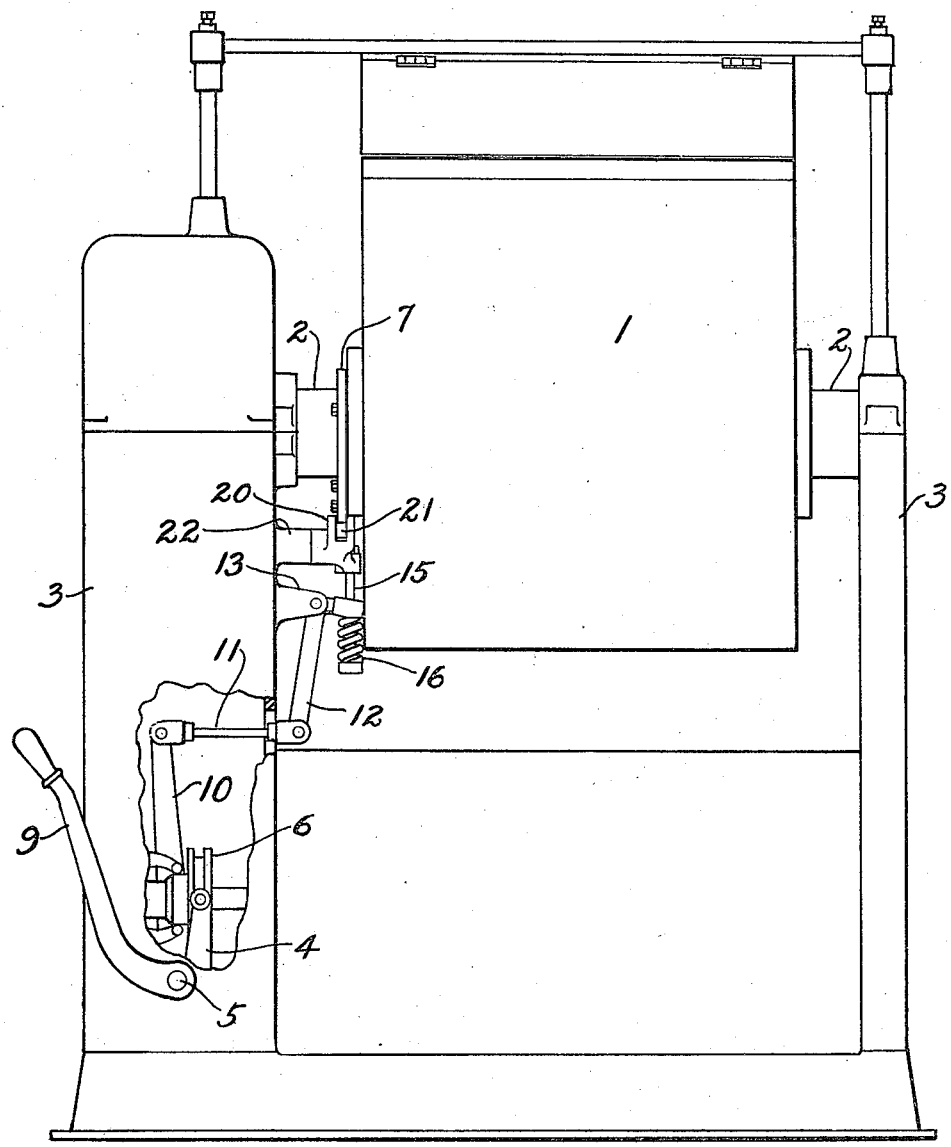
Figure 1 is a front elevation of a mixing machine showing my safety device.
Figure 2:
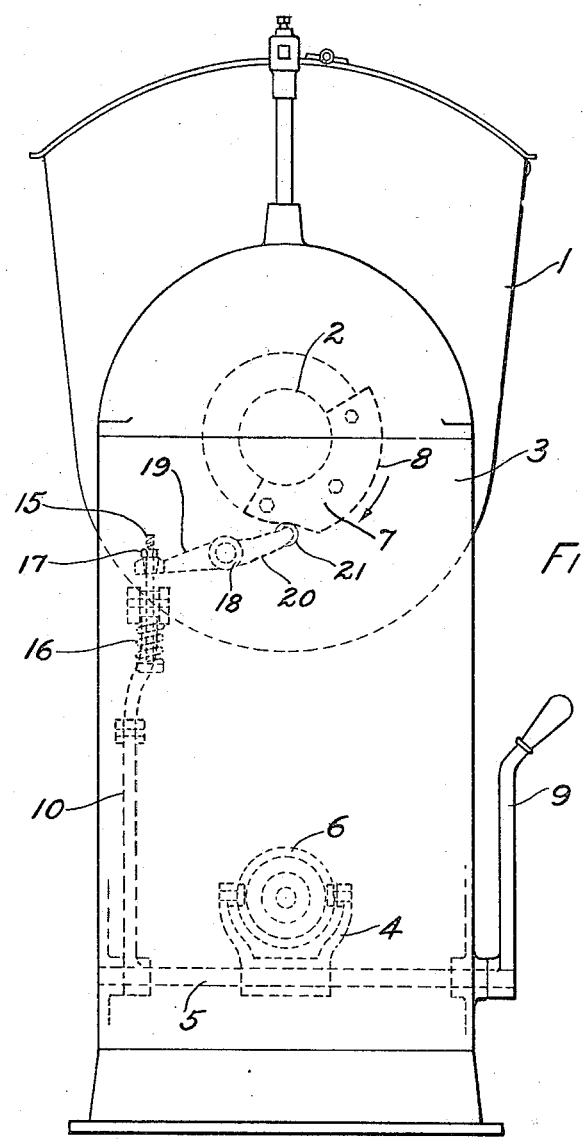
Figure 2 is an end view of the machine shown in Figure 1.

Referring to such parts of a standard mixer as are shown, 1 is the bowl supported on trunnions 2, 2, on the frame 3. The clutch fork 4 is supported on a cross rod 5 and operates on the clutch collar 6. The throwing in of the clutch imparts rotation to the mixer blade in the bowl (not shown in the drawings).

My invention relates to a throwing of the clutch by means of a member moving with the bowl, as it is tipped.

On the bowl trunnion nearest the clutch or the side of the bowl adjacent the trunnion, is set a cam 7, of which the peripheral portion 8 serves to control the clutch. Normally the clutch is operated by a handle 9 on the rod 5, but there is also a crank or lever 10 on the rod 5, by means of which the clutch can be opened.

This lever 10 is connected by means of a link 11 with a bell crank 12 mounted in the bracket 13 of the frame.

This bell crank has on its end away from the link a slotted head 14, which slides on a rod 15. The rod has a spring 16 thereon and ends in an adjustable nut 17 that forms the upper bearing for the spring, which bears at its lower end on the collar or else lies loosely on the rod.

By pulling up on the rod in this particular embodiment of my invention, the spring will be compressed and the bell crank forced up at the head 14, thereby pulling over the lever 10 and opening the clutch.

To pull up on this rod, I provide a member having a journal 18 supported on the frame member 22 and arms 19 and 20. The arm 19 is connected to the upper end of the rod 15, and the other arm 20 mounts an anti-friction roller 21.

The roller is so positioned as to engage the periphery of the cam 7, so that as the bowl is rocked, the cam will press down on the roller, thereby pulling up on the rod 15. The anti-friction roller rides on the cam preferably by gravity and the pulling up on the rod compresses the spring sufficiently to throw the clutch.

By adjusting the nut at the upper end of the rod the point of clutch release with relation to angle of tip of the bowl, can be regulated, and, as has been noted, the operator can force the clutch into meshing position by overcoming the spring. In case of accident, an operator will always release the lever by which he manually controls the clutch, and this will stop the movement of the mixing blade within the bowl.

It will be recognized that variation in the parts of the device above described in detail will not amount to departure from my invention, so long as the action of the bowl operates upon a spring which tends to throw out the clutch, which spring can be forced but will come into action whenever positive forcing thereof has ceased.

Having thus described my invention, what I claim as new and desire to secure by Letters Patent, is:—

1. In combination, in machines of the character described, a bowl adapted to tip to dump the contents, a clutch for coupling power to mixing means within the bowl, and resilient means under control of the bowl to throw out the clutch upon a tipping movement of said bowl, and means independent of the bowl for operating the clutch.

2. In combination, in machines of the character described, a bowl adapted to tip to dump the contents thereof, a clutch for coupling power to mixing means within the bowl, means controlled by the bowl in its tipping movement to throw out the clutch, and means manually controlled for forcing the clutch into engagement at any position of the bowl.

3. In combination, in machines of the character described, a bowl adapted to tip to dump the contents thereof, a clutch, means for operating the clutch to impart power to mixing means within the bowl, and additional means for moving the clutch to open position, comprising a lever, a spring, and means on the bowl for pressing the spring against the lever.

4. In combination, in machines of the character described, a bowl adapted to tip to dump the contents thereof, a clutch, means for operating the clutch to impart power to mixing means within the bowl, and additional means controlling the clutch to open the same comprising a lever, a rod engaging slidably one end of the lever, a spring on the rod adapted to press on the lever when the rod is moved, and means on the bowl for operating the rod to apply pressure to said spring against the lever, for the purpose described.

5. In combination, in machines of the character described, a bowl adapted to tip to dump the contents thereof, a clutch, means for operating the clutch to impart power to mixing means within the bowl, and additional means controlling the clutch to open the same comprising a lever, a rod engaging slidably one end of the lever, a spring on the rod adapted to press on the lever when the rod is moved, and means on the bowl for operating the rod to apply pressure to said spring against the lever, for the purpose described, and means for adjusting the position of the spring on the rod, to control the point of application of the spring to the lever during the movement of the rod.

6. In combination, in machines of the character described, a bowl adapted to tip to dump the contents thereof, a clutch, means for operating the clutch to impart power to mixing means within the bowl, and additional means controlling the clutch to open the same comprising a lever, a rod engaging slidably one end of the lever, a spring on the rod adapted to press on the lever when the rod is moved, and means on the bowl for operating the rod to apply pressure to said spring against the lever, for the purpose described, said means on the bowl comprising a cam, and a member having a roller engaging said cam, said member also engaging the said rod.

FRANK X. LAUTERBUR.